US000001503H

United States Statutory Invention Registration [19]

[11] Reg. Number: H1503

Threadgill

[45] Published: Dec. 5, 1995

[54] CORDLESS ELECTRIC GUITAR

[76] Inventor: Irene C. Threadgill, P.O. Box 614, 224 Bond St., Westbury, N.Y. 11590

[21] Appl. No.: 683,525

[22] Filed: Apr. 9, 1991

Related U.S. Application Data

[63] Continuation of Ser. No. 462,735, Jan. 9, 1990, abandoned.

[51] Int. Cl.[6] ..... G10H 3/00

[52] U.S. Cl. ..... 84/723

[58] Field of Search ..... 84/DIG. 24

[56] References Cited

U.S. PATENT DOCUMENTS

| | | | |
|---|---|---|---|
| 3,137,754 | 6/1964 | Evans | 84/DIG. 24 |
| 3,154,701 | 10/1964 | Evans | 84/DIG. 24 |
| 3,178,501 | 4/1965 | Evans | 84/DIG. 24 |
| 3,781,451 | 12/1973 | Nolan . | |
| 3,842,704 | 10/1974 | Prochilo . | |
| 3,868,880 | 3/1975 | Chapman . | |
| 4,126,073 | 11/1978 | Takabayashi . | |
| 4,160,401 | 7/1979 | Tomioka | 84/731 |
| 4,377,101 | 3/1983 | Santucci . | |
| 4,723,468 | 2/1988 | Takabayashi et al. | 84/722 |
| 4,903,566 | 2/1990 | McClish | 84/DIG. 24 |

FOREIGN PATENT DOCUMENTS

| | | |
|---|---|---|
| 1379666 | 10/1964 | France . |
| 2906180 | 8/1980 | Germany . |
| 3426247 | 2/1986 | Germany . |

*Primary Examiner*—Bernarr E. Gregory
*Attorney, Agent, or Firm*—Terry M. Gernstein

[57] ABSTRACT

An electric guitar includes a direct pickup that is physically and mechanically connected to the strings of the guitar instead of by an acoustic coupling. Such direct connection prevents noise, and other distortions associated with over-the-air connections from interfering with the transmission of sounds from the strings to the pickup device.

1 Claim, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CORDLESS ELECTRIC GUITAR

This is a continuation of application Ser. No. 07/462,735, filed on Oct. 9, 1990, now abandoned.

TECHNICAL FIELD OF THE INVENTION

The present invention relates to the general art of musical instruments, and to the particular field of sound transmitting systems associated with musical instruments.

BACKGROUND OF THE INVENTION

Electrical guitars require various electrical cords which extend from the guitar to the source of electrical power such as a standard wall outlet or the like. In addition, the guitar must be connected by electrical cords to any amplifying equipment and any other sound signal conditioning system associated with the guitar. As a result, the movement of a musician using the guitar is often restricted and inhibited, with the performer often becoming entangled in the electrical cords associated with the instrument.

Accordingly, the art has contained several examples of electrical guitars that are intended to alleviate this problem. For example, U.S. Pat. No. 3,781,451, the disclosure of which is incorporated herein by reference, discloses an electric guitar that operates without the use of cords.

While somewhat successful, devices such as the incorporated patented device suffer from a drawback in that they use a microphone or other such acoustic transducer to pick up the pressure fluctuations in the air associated with the strings and convert such pressure fluctuations into electrical signals which are then translated back into acoustic signals via speakers or the like.

Several psychoacoustic studies have indicated that there is a difference in pressure level sensed for audible sounds in minimum audible pressure between sounds heard over the air as opposed to sounds heard directly through a headphone. Noise, and the like contributes to such difference. Furthermore, loudness and pitch may differ when an acoustic signal is received over the air as opposed to directly, and masking may be more likely to occur when a sound signal is heard over the air as opposed to directly.

Therefore, devices such as the incorporated patented device suffer some degradation in sound reproduction because they use an over-the-air connection between the strings of the instrument and the sound pickup devices thereof.

Therefore, there is a need for a musical instrument, such a guitar, which faithfully reproduces the sounds emitted by the strings of that instrument without being subject to acoustic distortions and interference associated with over-the-air sound transmission between the strings and the sound pickup device.

OBJECTS OF THE INVENTION

It is a main object of the present invention to provide a stringed musical instrument, such as a guitar, which faithfully reproduces the sounds emitted by the strings of that instrument.

It is another object of the present invention to provide a stringed musical instrument, such as a guitar, which faithfully reproduces the sounds emitted by the strings of that instrument without being subject to acoustic distortion and interference associated with over-the-air sound transmission between the strings and the sound pickup device.

SUMMARY OF THE INVENTION

These, and other, objects are achieved by guitar similar to that disclosed in U.S. Pat. No. 3,781,451, but with the strings thereof physically and mechanically connected directly to a pressure transducer. The pressure transducer replaces the microphone disclosed in the incorporated patent and the direct physical connection between the strings and the transducer causes the transducer to generate signals corresponding to the vibrations in the strings. Each string is connected to an individual transducer, and the signals from the individual transducers are combined in a synthesizer-type device. The transducer signals are thus mixed and combined and then are retransmitted to the other sound signal conditioning devices associated with the guitar.

In this manner, the sound from the guitar is faithfully reproduced for playback, and interference and errors associated with over-the-air acoustic transmission between the strings and the sound pickup devices is eliminated.

BRIEF DESCRIPTION OF THE DRAWING FIGURES

DETAILED DESCRIPTION OF THE PREFERRED EMBODIMENT OF THE INVENTION

Figure 1:
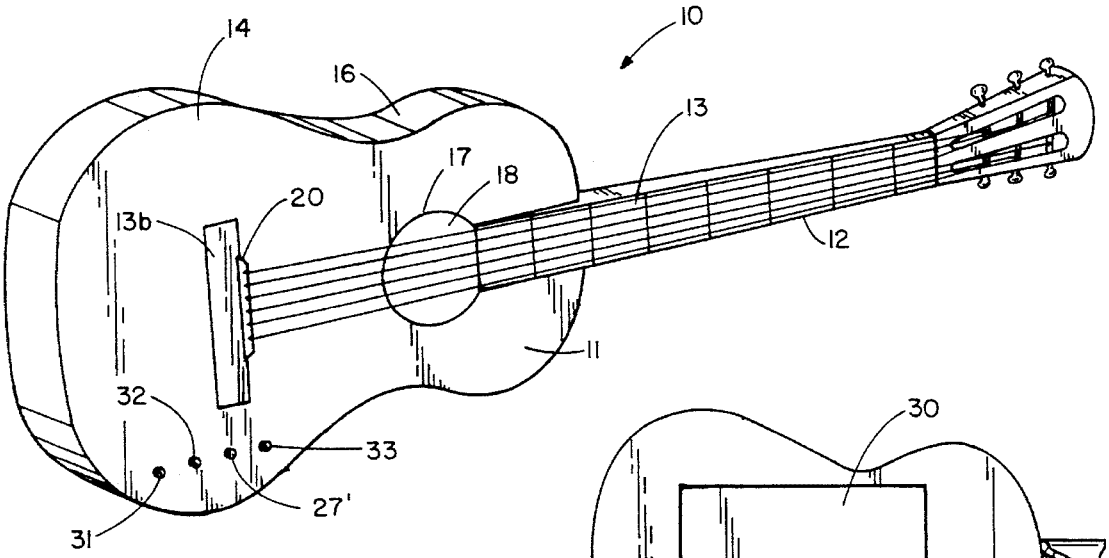
FIG. 1 is perspective view of a guitar embodying the present invention.
Figure 2:
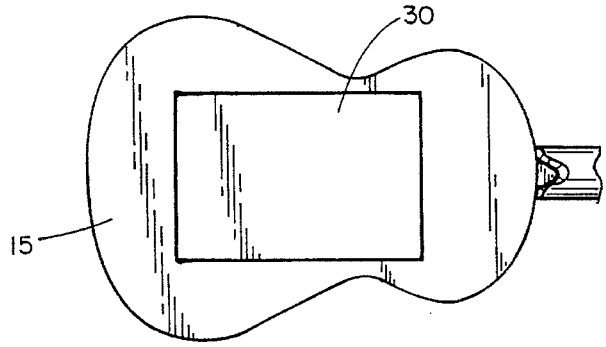
FIG. 2 is a rear elevational view of the guitar.
Figure 3:
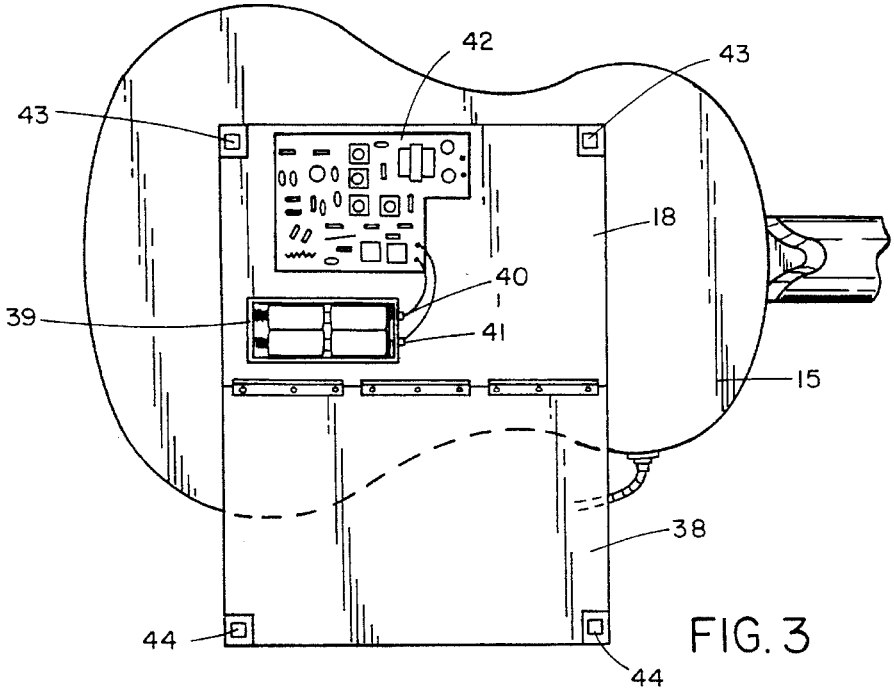
FIG. 3 is a rear elevational view of the guitar with a closure cover open.

Shown in FIG. 1 is an electric guitar 10 embodying the present invention. The guitar 10 includes a hollow main body 11 having a plurality of strings 13 strung on the front surface thereof. The strings are attached at opposite ends thereof to the neck and to a bridge base **13*b* on the main body. The main body 11 has a top panel 14 and a bottom panel 15 spaced apart and connected to an outer wall 16. Panel 14 is provided with a hole 17 which extends beneath strings 13. An audio speaker 18 is mounted to the inside surface of panel 14 and is positioned adjacent to the hole 17 defined through the top panel which extends beneath the strings. Speaker 18 is connected to a radio mounted within the main body 11 and to a device 20 which produces electrical signals in response to vibrations generated by strings 13**.

As shown in FIG. 1, there is a direct, physical connection between the strings and the device 20 as opposed to the over-the-air connection between the acoustic device shown in the incorporated patent. The vibrations set up in the strings as the instrument is played are transferred directly to the device 20 via the physical connection so that distortion and like acoustic interference will not be present.

Figure 4:
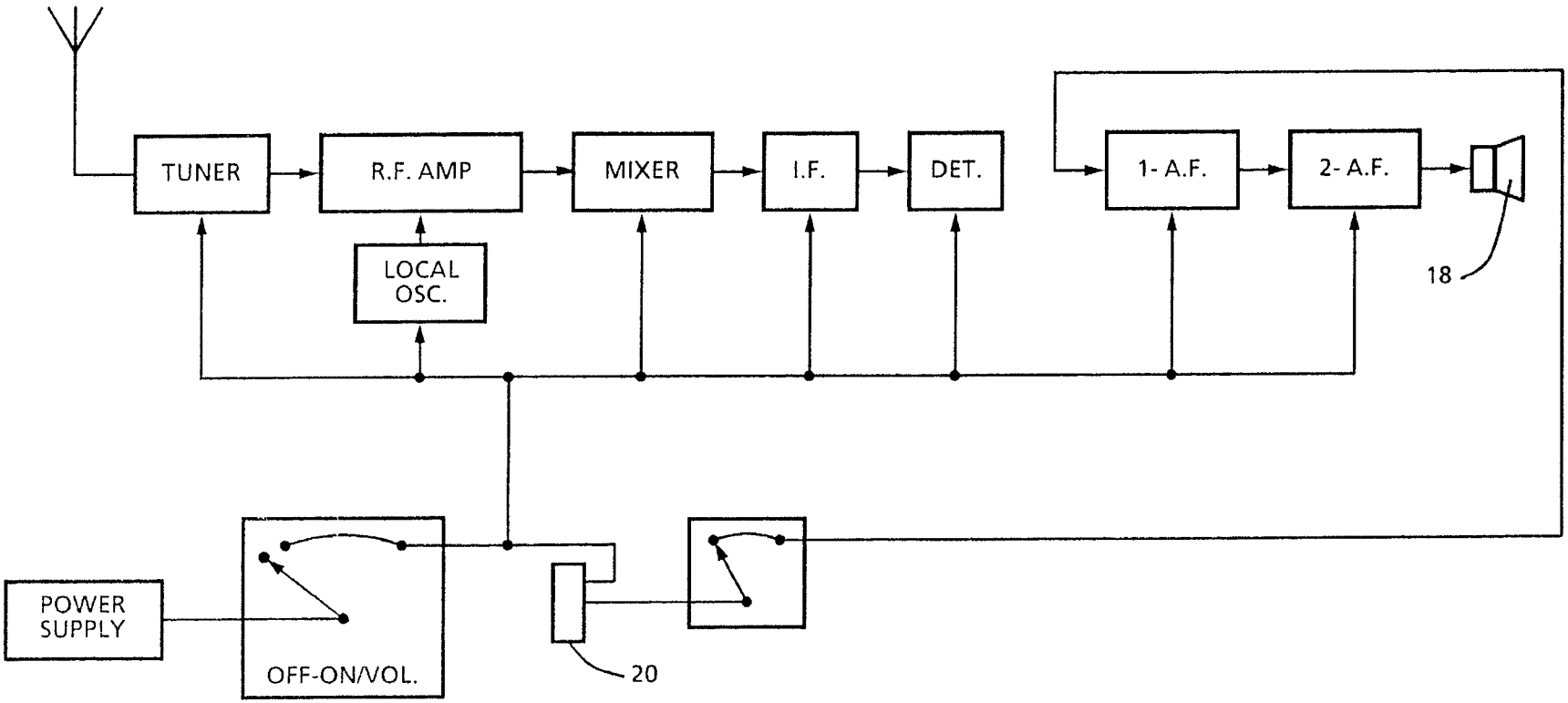
FIG. 4 is a modified form of the circuit shown in the incorporated patent showing the modification thereto to have a direct pickup device substituted for a microphone disclosed in the incorporated patent.

The block diagram shown in FIG. 4 is similar to the block diagram shown in FIG. 4 of the incorporated patent, and thus will not be discussed in detail.

However, the device of the present invention has modified the incorporated device by eliminating the microphone used in that incorporated device and substituting a direct pickup device 20. therefor. There are a plurality of direct and separate pickup devices, and each direct pickup device is connected directly to one of the strings 13 to receive the vibrations of the string.

The direct pickup device 20 translates these mechanical vibrations into electrical signals, and transmits these signals to the remainder of the circuit in a manner that is identical to that transmission of signals from the microphone of the incorporated patent. These signals are then used by that circuit in the same manner as the incorporated patent to generate the sounds associated with the guitar.

The direct pickup device 20 can include a piezoelectric transducer in the bridge base **13*b* which produces an electric signal when a mechanical force is applied thereto. The crystal of the transducer is selected to have a natural resonant frequency equal to the natural resonant frequency of the string to which it is attached and thus will generate a current signal corresponding to that string frequency. The device 20 will also include suitable amplifiers and like circuit devices that condition the signal from the transducer into a signal that is suitable for use by the remainder of the circuit. The signals from the device 20** will be mixed and operated on in the same manner as the signals produced by the microphone of the incorporated patent.

The signals from the direct pickup device of the present invention are thus not subject to the distortions and noise and losses associated with over-the-air pickup devices, and the guitar of the present invention will reproduce sounds of the strings more faithfully than other devices such as the incorporated patent.

Suitable piezoelectric devices are disclosed in standard textbooks and standard handbooks, such as "Handbook of Electronics and Electrical Engineering" edited by Charles Belove and published by Wiley Interscience in 1986, the disclosure of which is incorporated herein by reference, along with the references cited in such incorporated handbook.

It is understood that while certain forms of the present invention have been illustrated and described herein, it is not to be limited to the specific forms or arrangements of parts described and shown.

I claim:

1. A musical instrument comprising:

A) a guitar having a hollow body forming a sound box with a long neck attached thereto and a plurality of strings, each having one end thereof attached to said neck;

B) a battery holder mounted within said hollow body for receiving at least one battery, said battery holder having electrical output terminals connectable with said battery for providing electrical energy;

C) a radio receiving set mounted within said hollow body and connected to said terminals for the operation of said set, said radio receiving set including antenna means, an audio speaker and a first amplifier;

D) a sound pickup means mechanically and physically connected to another end of each string of said plurality of strings and converting mechanical vibrations associated with said stings into electrical signals, said sound pickup means including a plurality of piezoelectric transducers each physically connected to one of said plurality of strings and to said first amplifier and converting the mechanical vibrations associated with the string connected thereto into electrical signals that are proportional to the mechanical vibrations of the string connected thereto; and E) switch means mounted on said main body and connected between said battery and said sound pickup means.

* * * * *